(12) United States Patent
Sukarukoff

(10) Patent No.: US 7,446,273 B2
(45) Date of Patent: Nov. 4, 2008

(54) SAFETY LOCKOUT SYSTEM FOR INTERRUPTING UNINTENTIONAL FLOW OF ELECTRICAL CURRENT CONTROLLED BY A SAFETY SWITCH

(75) Inventor: Brian Sukarukoff, Westland, MI (US)

(73) Assignee: Jokab Safety North America, Inc, Westland, MI (US)

( * ) Notice: Subject to any disclaimer, the term of this patent is extended or adjusted under 35 U.S.C. 154(b) by 56 days.

(21) Appl. No.: 11/648,809

(22) Filed: Jan. 3, 2007

(65) Prior Publication Data

US 2008/0156623 A1 Jul. 3, 2008

(51) Int. Cl.
*H01H 3/16* (2006.01)

(52) U.S. Cl. .................................... 200/61.62
(58) Field of Classification Search .............. 200/61.62, 200/61.64, 43.11, 43.15, 43.16
See application file for complete search history.

(56) References Cited

U.S. PATENT DOCUMENTS

| | | | | |
|---|---|---|---|---|
| 5,463,196 A | * | 10/1995 | Darimont ................. | 200/43.16 |
| 5,817,999 A | * | 10/1998 | Mugan et al. ............ | 200/50.11 |
| 5,821,484 A | * | 10/1998 | Schulze et al. ........... | 200/17 R |
| 5,868,243 A | * | 2/1999 | Bachle ...................... | 200/334 |
| 5,896,759 A | * | 4/1999 | Barrena et al. ............ | 68/12.26 |
| 6,376,786 B1 | * | 4/2002 | Ishibashi .................. | 200/61.62 |
| 6,439,446 B1 | * | 8/2002 | Perry et al. ............... | 227/175.2 |
| 6,608,265 B2 | * | 8/2003 | Shinkawa ................. | 200/61.64 |
| 6,653,581 B2 | * | 11/2003 | Bassi ....................... | 200/61.62 |
| 6,696,652 B1 | * | 2/2004 | Spies ....................... | 200/61.62 |
| 6,712,774 B2 | * | 3/2004 | Voegele et al. ............ | 600/567 |
| 2002/0168924 A1 | * | 11/2002 | Visaisouk et al. .......... | 451/39 |

\* cited by examiner

*Primary Examiner*—Michael A Friedhofer
*Assistant Examiner*—Lisa N Klaus
(74) *Attorney, Agent, or Firm*—Bernard J. Cantor

(57) ABSTRACT

A safety lockout system deactivates a safety switch to interrupt unintentional electrical current flow or signals controlled by a safety switch which is used on door-like closures. The switch generally comprises two components: one mounted on a moveable closure and the other mounted on an adjacent fixed member, such as a door frame. When the two components are aligned and closely adjacent to each other, as when the closure is in closed position, the switch allows current to flow to an electrically powered device. But when the closure is in its open position, the components are not aligned or closely arranged next to each other so that the lockout system automatically deactivates the switch which then prevents unintentional current flow to the device. The closure and the adjacent fixed member are normally locked together by a slider element which engages a keeper element when the closure is in its closed position. When the closure is moved to its open position, the slider element automatically moves to cover one of the switch components and to prevent the closure from completely closing so as to keep the components separated. That deactivates the switch until the slider is deliberately, manually moved out of its component blocking and anti-closing positions and the closure is intentionally moved into its closed position to reactivate the safety switch.

7 Claims, 6 Drawing Sheets

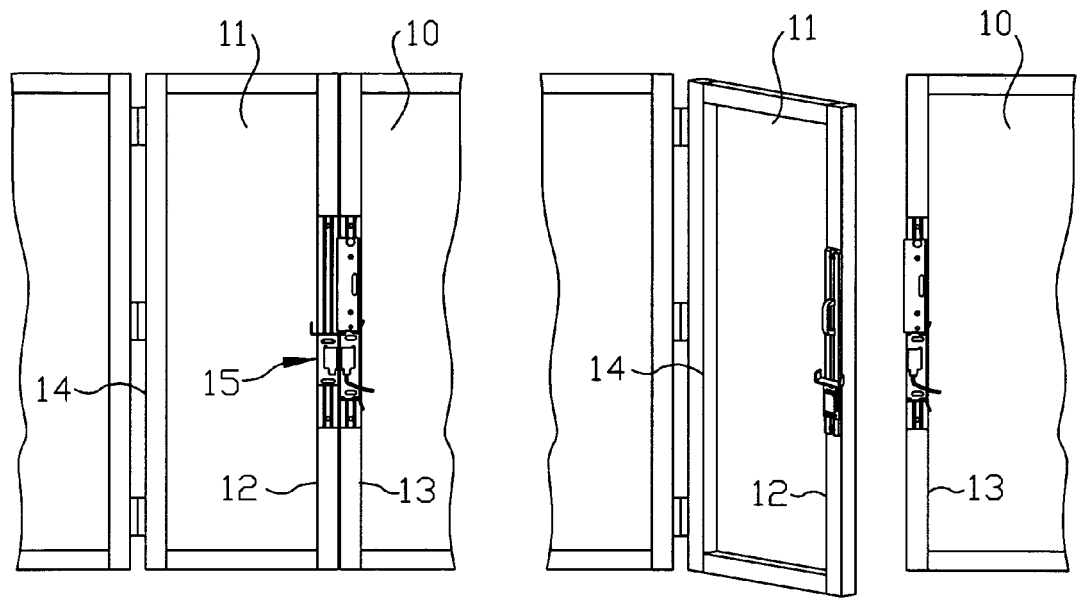
FIG. 1
FIG. 2
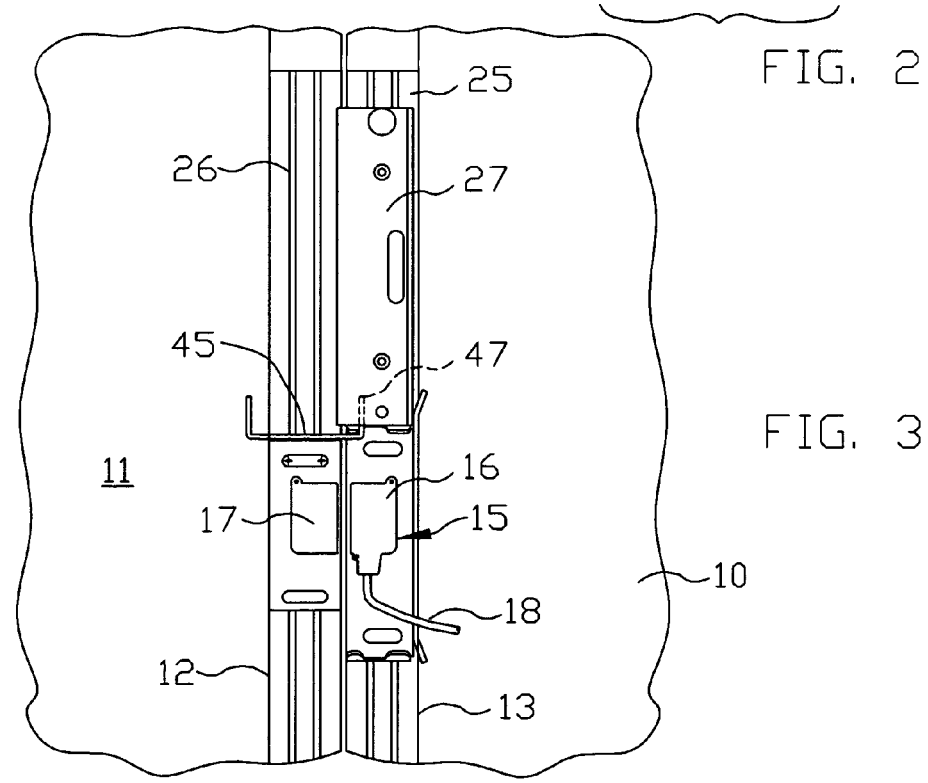
FIG. 3

SAFETY LOCKOUT SYSTEM FOR INTERRUPTING UNINTENTIONAL FLOW OF ELECTRICAL CURRENT CONTROLLED BY A SAFETY SWITCH

BACKGROUND OF INVENTION

This invention relates to a lockout system which is particularly useful on electrical control safety switches arranged on door-like closures which cover openings in fence-like enclosures that are used to guard electrically powered industrial equipment in order to restrict access to such equipment.

Safety switches are frequently used on door-like closures in factories so that when the closures are opened, the electrical power supply to the enclosed equipment is interrupted and remains interrupted until the closures are returned to their closed positions. Thus, workmen entering an enclosed area to maintain or to service or to otherwise contact the enclosed equipment are protected against movement of the equipment or electrical shocks while they are within the enclosure or guarded area.

A problem encountered is that if the closure is inadequately or accidentally closed, the switch on the closure may be inadvertently activated and complete the safety circuit to the equipment allowing equipment to operate in an unsafe manner. Hence, the invention herein relates to a lockout system which prevents an open closure from being inadvertently closed so that the door switch is inadvertently activated when someone is within the enclosure. The lockout system prevents the safety switch from completing the safety circuit when the door is opened and prevents the door from being unintentionally closed.

In more detail, the use of walls or fences or other restraining barriers around equipment within a factory is common. Particularly where robots or other electrically powered equipment are used, it is common to erect a protective fence or wall or other enclosure around the equipment. The electrical power supplied to the equipment, as a safety measure, may be interrupted whenever a door-like closure is opened so that someone may enter the enclosure and contact the equipment without fear of hazardous motion or of electrical shocks. However, there remains a possibility that someone may inadvertently close the door or that the door may otherwise swing shut when a workman is within the enclosure and does not want to have the electrical current actuated or the equipment in operation or any type of motion by the equipment.

The term door is intended here to encompass closures, such as doors, hatches, gates, etc., whether of a swinging or sliding type, which is used to close an opening in some sort of wall or fence or other restraining barrier. Thus, the term "door" is used in a generic sense herein.

A common type of electrical safety switch for such doors may be formed with two components, one mounted on the edge of a door and the other mounted on the frame or edge of the opening which the door normally closes. The two components cooperate to control the flow of power to equipment or other power using paraphernalia. Such two-part or two-component switches may be operated to allow current flow by having cooperating sensing devices which sense or signal when the two components are aligned and are closely adjacent. Conversely, when the two components are not aligned and/or are spaced apart widely, the switch is deactivated and interferes with the flow of current. Thus, sensing devices, for example, may be in the form of photoelectric cells, or magnetic sensors, or radio signals, or induction sensors or mechanical contacts, or key lock devices, or the like.

For practical use, the sensors that are used should operate to control or switch on the flow of current when the sensors are properly aligned and the door is closed relative to the door frame or the edge of the opening and, conversely, to switch off to prevent the flow of current when that condition is not present. Thus, the lockout system is intended to normally assist in locking the door in its closed position and, conversely, to prevent the door from closing after it is opened until someone manually operates the lockout system to again close the door. Hence, unless the door lockout system is manually and deliberately operated, the door will not close and, accordingly, the switch components will not be properly aligned so that electrical current flow to the enclosed equipment is prevented. The lockout system preferably includes an arrangement whereby the workmen must manually unlock the door to open the door, and once the door is open, the system prevents the door from closing until a deliberate manual act is performed. Hence, the lockout system will automatically keep the door from closing until it is deliberately intended to be closed.

The lockout system provides a simple, inexpensive construction which may be installed on pre-existing enclosures.

Thus, it is intended to be "fool proof" so that it may not be accidentally or inadvertently deactivated when the door is in open position. Consequently the system prevents the accidental flow of electrical current to enclosed electrically powered equipment when the door to the enclosure is not deliberately closed.

SUMMARY OF INVENTION

This invention contemplates a lockout or deactivation system for conventional electrical control switches that are used on most types of door-like closures which provide access to electrical powered equipment that is enclosed or guarded by a conventional enclosure. The system prevents the flow of electrical current or signals to the equipment when the closure is opened.

Such switches in general comprise two or more cooperating components. One component is mounted on the closure or door and another component is arranged or formed on the adjacent door frame or edge of the opening which the door normally covers. When the components are properly aligned and closely adjacent to each other, that is, when the door is in its closed position, the switch is activated to pass electrical current or signals, which may be supplied through other switches or devices, to the operating machinery or equipment or to other desired places.

Such switches normally are de-actuated to prevent the flow of electrical current or signals when the door is opened. That is, the flow of electrical current is interrupted by the separation or non-alignment of the switch components. The lockout device of this invention is intended to prevent the door from completely closing inadvertently or unintentionally, so as to prevent the alignment of the switch components or mechanical activation which would accordingly allow the flow of electrical current or signals.

The lockout device comprises, in general, one switch component formed on the free edge of the door or closure and a second switch component formed on the door frame in alignment with the door edge component.

A vertically arranged slider element is slideably mounted above one of the switch components which, for example, is the one that is mounted on the door frame. The slider may engage a keeper or stop which is mounted on the door edge. When the slider is moved downwardly, but still above the frame component, the slider and the keeper interlock which will lock the door edge to the door frame. When it is desired to open the door, the slider may be manually lifted to disengage it from the keeper so that the door can be swung or slid open. At that point, the upwardly raised slide member located on the frame will slide downwardly to cover the frame component above which it was mounted. That blocks the keeper and the door edge on which the keeper is arranged, from closely aligning with the frame. Thus, the frame component which is covered by the slider cannot align with, or be closely adjacent to, the component on the door edge. Hence, the non-aligned components prevent the switch from operating to pass current or signals. The door cannot be closed unless the slider is again raised high enough above the frame component so that the slider's lower edge engages the keeper and the slider no longer covers the frame component.

Preferably, the slider is mounted on a track which is vertically arranged and secured to the jamb or frame edge defining the opening in the enclosure while the keeper is secured to the free edge of the door. But that arrangement may be reversed with the keeper mounted on the jamb and the slider mounted on the door edge.

It is contemplated that the lockout would preferably be used on a hinge-type or sliding-type door or gate formed in a fence or wall which encloses electrically powered industrial equipment. However, as mentioned above, the enclosure may be varied in construction and similarly, the "door" may be in the form of a gate or a hatch or other conventional type of closure which can be either swung or slid into position for covering an opening in a restraining barrier or wall.

An object of this invention is to provide a simply made, inexpensive, lockout device that may be installed on almost any type of sensing switch used for sensing the closing and opening of a door-like closure without necessarily replacing the switch or revising its construction or its mounting. Thus, an object is to provide a lockout system that may be easily installed by a workman on a pre-existing protective enclosure, using ordinary hand tools, for preventing the door from fully closing unless such closing is deliberately intended. Consequently preventing unintentional closing of the door prevents the passage of electrical current or signals through the switch when someone is working on or is in the vicinity of electrically powered equipment arranged behind the closure.

Another object of this invention is to provide a safety switch lockout construction which is inexpensive to manufacture, to install and easy to use so that it can be easily adopted in desired areas in a industrial plant, and so as to protect workmen who intermittently must contact normally enclosed equipment for maintenance, service, or inspection, or the like, from being unintentionally subjected to hazardous motion of the equipment or to electrical currents.

Yet another object of this invention is to provide a lockout system which is very simply constructed, inexpensive, and is basically automatic and "fool proof" in its operation.

Still another object of this invention is to provide a lockout system which can be installed on most, if not all, conventional safety locks, including key-operated mechanical types of locks.

These and other objects and advantages of this invention will become apparent upon reading the following description of which the attached drawings form a part.

DESCRIPTION OF DRAWINGS

The drawings described herein are for illustration purposes only and are not intended to limit the scope of the present disclosure in any way.

FIG. 1 schematically illustrates a fragment of an enclosure fence or barrier and, particularly, the closure or door of the fence in closed position.

FIG. 2 schematically illustrates a fragment of the enclosure of FIG. 1 but with the door in an open position.

FIG. 3 is a fragmentary view of the door in closed position relative to the door frame and the lockout system in locked position for preventing opening of the door.

DETAILED DESCRIPTION

Figures 4, 5:
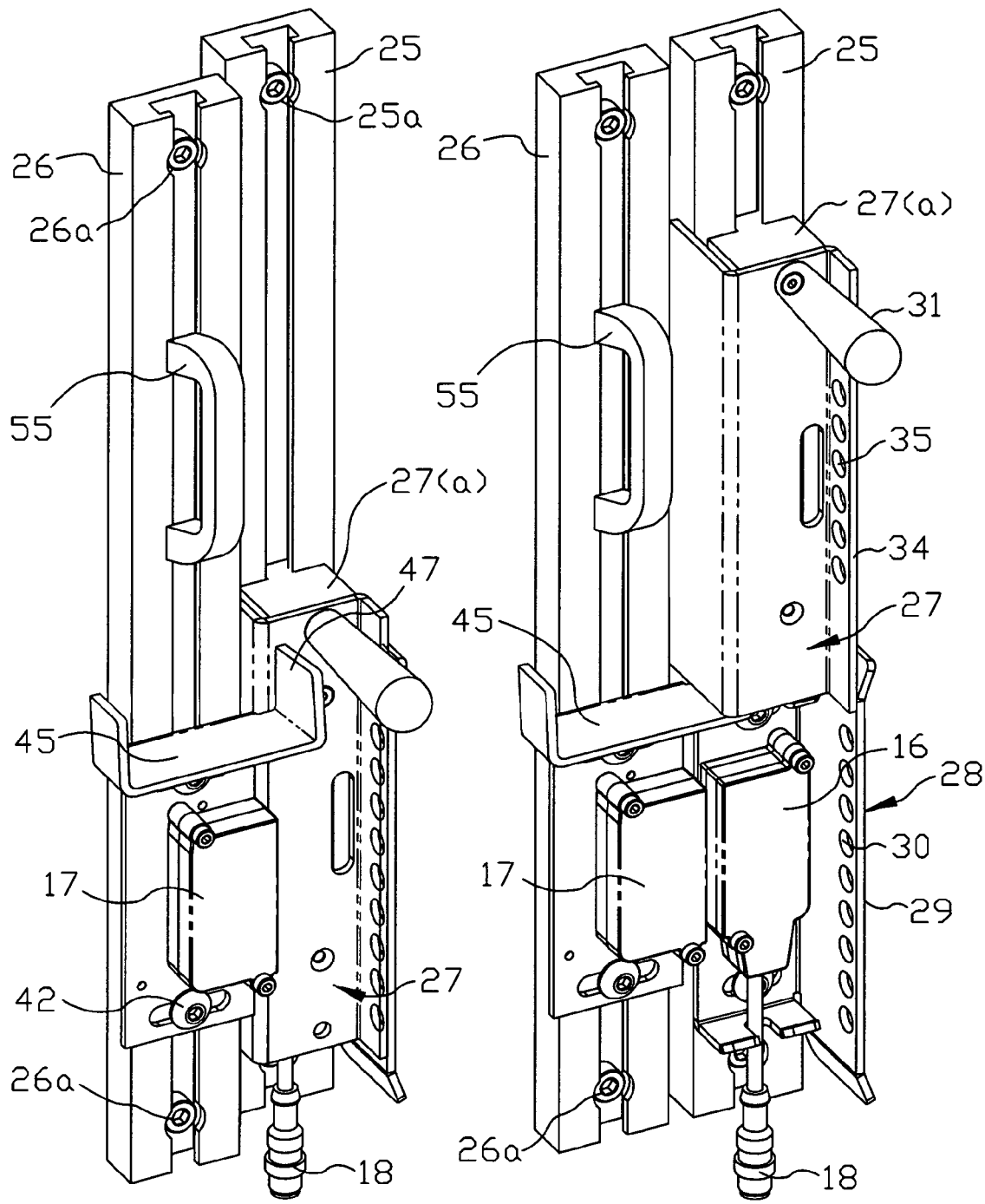
FIG. 4 is an enlarged, perspective view of the lockout system in door locking position and with the door and frame switch components in alignment for permitting the flow of electrical current.
FIG. 5 is an enlarged, perspective view of the lockout system showing the door partially open relative to the door frame and the slider arranged in position to cover the door edge switch component and to prevent alignment of the switch components for preventing the flow of electrical current.

Referring to the drawings, FIGS. 1 and 2 illustrate a fragment of an enclosure or barrier or fence 10 for enclosing an area in, for example, a factory, where machinery may be located and it is desired to limit personnel contact with that machinery. An example of such machinery might be a robot system which normally is electrically powered and operates without a workman other than for maintenance or other service requirements. The enclosure or fence may comprise a frame with a central mesh or solid panel construction. Such constructions are conventional.

The enclosure normally includes an opening through which workmen may pass when necessary and a door or closure 11 which closes that opening. In the illustrations in FIGS. 1 and 2, the particular door has a vertical edge 12 which normally is closely adjacent a door frame or door jamb 13. In this instance, the door is illustrated as being of the hinged type with its edge 14 being hinged to the enclosure frame so that the door may be swung open and closed.

Although the drawings illustrate a hinged door construction, the door could be of a conventional sliding door-type. Alternatively, the door may be in the form of a hatch which slides or swings over an opening in a barrier or a gate or the like type of closure for an opening in a barrier.

A safety switch 15 is mounted or otherwise attached or formed on the door free edge 12 and the door jamb or frame 13. The safety switch, in the illustration of the drawings, comprises two components, namely, a jamb or frame component 16 and a door edge component 17. An electrical line (see FIG. 3) 18 connects the door jamb component 16 to an electrical power circuit (not shown).

It is common, in industrial buildings where electrically powered equipment is kept within enclosures or barriers to limit contact with workmen or other factory personnel. Thus, to avoid the possibility of a workman or other person being injured by a hazardous motion of equipment located in the enclosed area, it is common to utilize a safety switch which interrupts the circuit that delivers the electricity or signals to the equipment within the enclosure. The safety switch is commonly mounted on the entrance door or closure or other place outside of the enclosure or barrier so that the safety switch can be turned on or off, thereby interrupting the electrical current to the equipment, before someone approaches the equipment or is otherwise too close to the equipment to avoid hazardous motions by the equipment.

Various types of safety switches are provided which all, in essence, are made to interrupt the electrical current flow to the equipment when someone approaches and/or otherwise contacts or engages that equipment.

Where the safety switch or interrupter switch is mounted on the closure or door of the enclosure, it is common to form the switch of two inter-engaging or cooperating components, one component being on the door edge and the other being on the adjacent jamb or frame edge. Thus, when the two components are aligned and relatively closely adjacent or mechanically linked, a signal is passed through the switch which permits the uninterrupted flow of electricity through the normal electrical power supply line to the equipment within the enclosure. But, when the components are unaligned and/or otherwise moved further apart, beyond a predetermined distance, or mechanically disengaged, the switch serves to interrupt the flow of electricity through the circuit that powers the equipment.

As mentioned above, a problem that exists is that it may be possible to close the door or closure accidentally or inadvertently while someone is in the vicinity of the equipment or is otherwise engaging the equipment. In such an event, the safety switch allows the current to flow to the equipment unexpectedly which becomes hazardous for anyone working on or near the equipment. Thus, it is desirable to prevent the safety switch, after it is deactivated, by opening the door or closure, to inadvertently become activated as, for example, by some passerby slamming the door shut while going by it or by the door otherwise being closed accidentally.

Figures 6, 7:
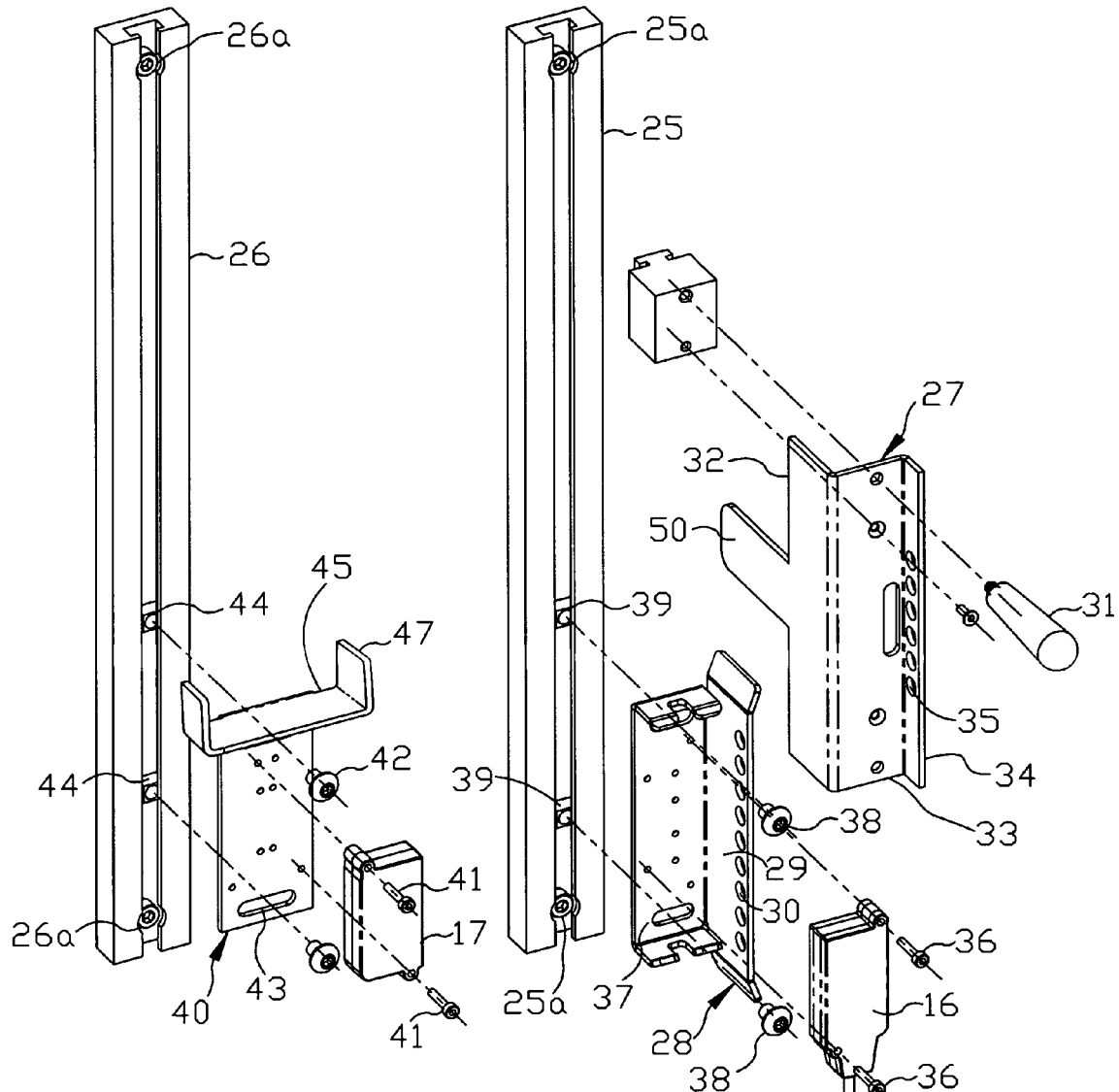
FIG. 6 is an exploded view of the door edge switch component and door keeper.
FIG. 7 is an exploded view of the frame switch component and the slider parts.

Referring to FIGS. 4, 6 and 7, the lockout system includes a jamb or frame channel 25 which is fastened by screws 25a to the door or frame jamb 13. A similar door edge channel member 26 is fastened by screws 26a to the lead or free edge 12 of the door 11. A slider 27 (see FIG. 7) having a slide block 27a is arranged to slideably engage a slider guide 28 that is fastened to the channel 25. The slider guide includes an elongated side flange 29 which is provided with openings or holes 30. These enable the locking of the slider 27 against sliding motion when desired.

The slider 27 has a slider handle 31 for manually grasping and moving the slider upwardly or downwardly. Also, the slider is formed with a side flange 32, which is integral with the base plate 33, and a bent guide flange portion 34 having holes 35 which may be registered with the holes 30 in the slider guide.

The switch component 16 is attached by screws 36 to the slider guide 28. Also screws 38 extending through openings 37 in the slider guide 28 engage screw nuts 39 arranged within the channel 25 fasten the guide to the channel. Thus, the switch component 16 is fixed in position upon the jamb.

Figure 10:
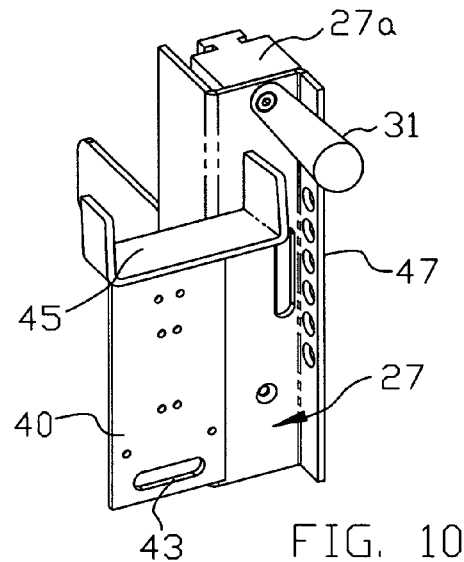
FIG. 10 is a perspective view of the slider and the keeper plate engaged for preventing the door from fully closing.
Figure 9:
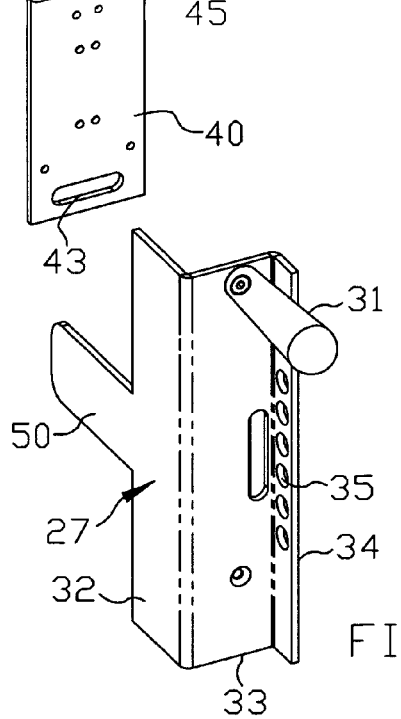
FIG. 9 is a rear view of the slider, shown in perspective.

The door edge component 17 is secured to the door edge mounting plate 40 (see FIG. 6) by screws 41. The plate 40 is fastened to the door edge channel 26 by screws 42 which extend through holes 43 in the plate 40 are connected to nuts 44 arranged in the door edge channel 26. The upper portion of the door edge mounting plate 40 includes a laterally extending blocking flange 45 (see FIG. 6) and FIGS. 8 and 10.

The blocking flange 45 includes a bent-up keeper portion or tab 47 which is arranged to fit within the lower portion of the slider 27 for locking the door. The flange 45 engages the outside surface of flange 32 of the slider 27 to prevent closing the door.

Figure 8:
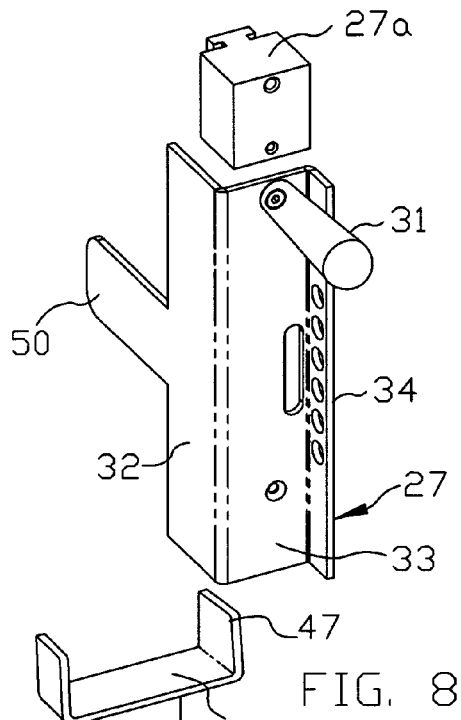
FIG. 8 is a fragmentary view, in perspective, illustrating the slider and keeper relationship, but disassembled.
Figure 11:
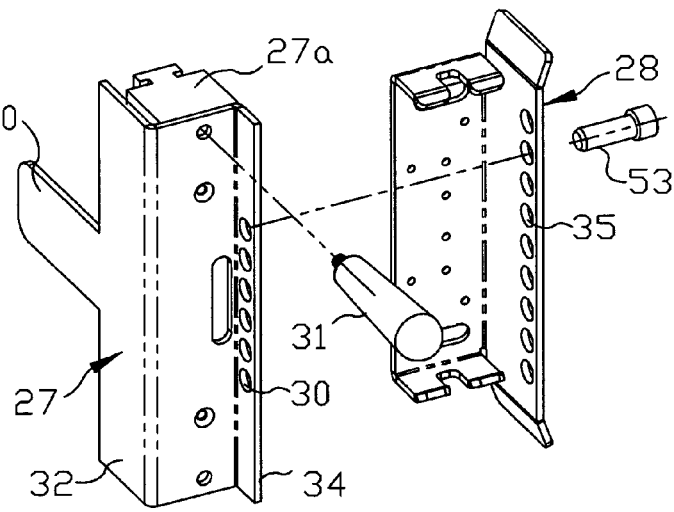
FIG. 11 is a perspective view showing the relationship between the slider and the frame guide and locking strip for the slider.

As can be seen in FIG. 7 and, also, in FIGS. 8 and 11, a rearwardly extending handgrip flange 50 is formed on the slider flange 32. That flange 50 normally would extend through the gap between the door edge and the frame or jamb so that someone who is within the enclosure is provided with a handle by which the person may lift the slider upwardly while still inside of the enclosure. When the person is located outside the enclosure, the slide handle 31 is manually gripped to raise the slider.

Figures 14, 15:
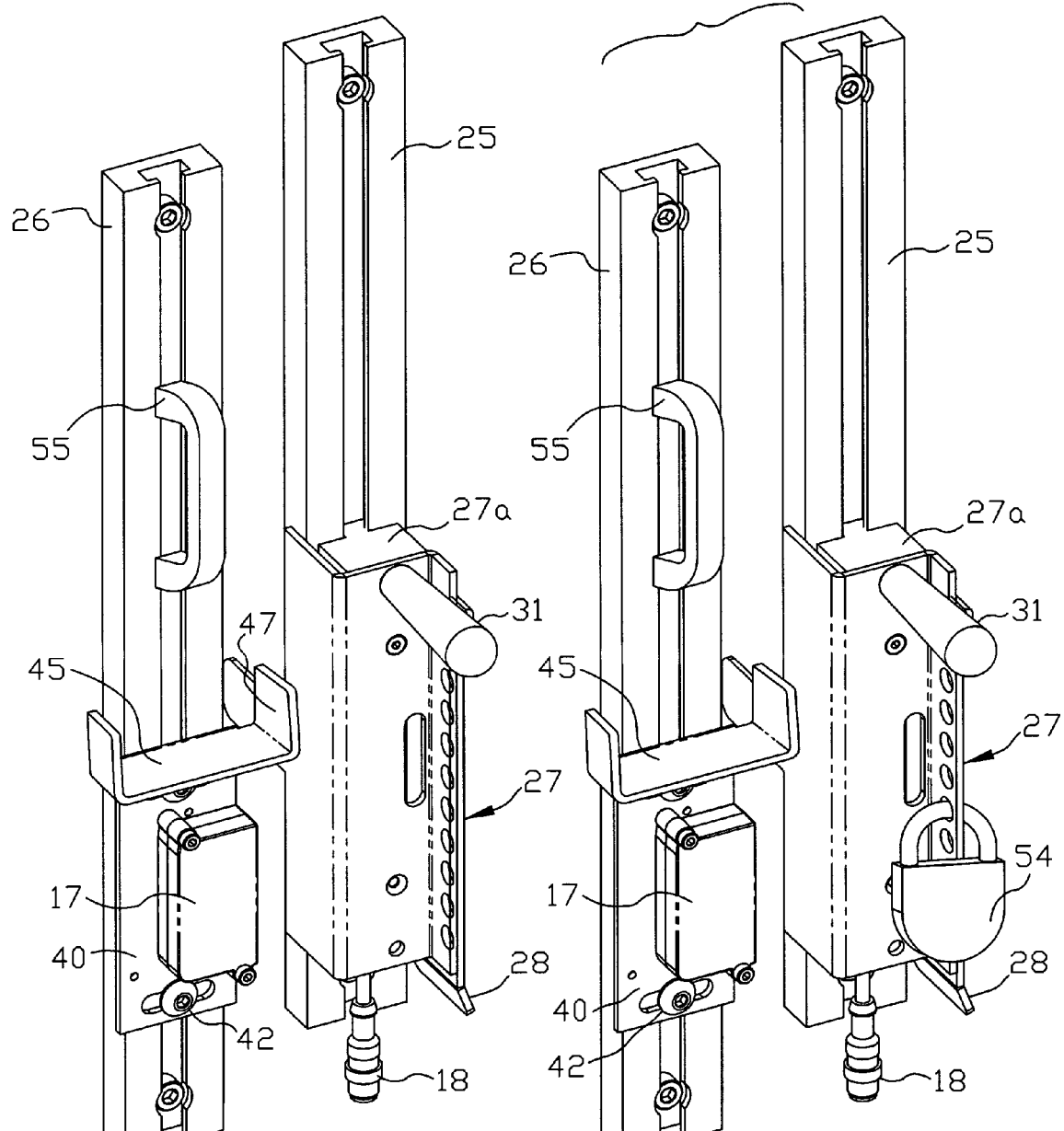
FIG. 14 is a fragmentary view showing the door open and the slider dropped down to cover the frame switch component.
FIG. 15 is a view similar to FIG. 14, but illustrating the slider locked temporarily against upward movement by a padlock so that the door cannot close.

As illustrated in FIG. 11, a pin 53 may be inserted through one of the aligned holes 35 in the slider or 30 in the slide guide to prevent the slider from moving. Optionally, as illustrated in FIG. 15, a conventional padlock 54 may be inserted through the aligned holes 30 and 35 to prevent the slider from moving until the padlock is unlocked and removed.

In operation, the door or closure is kept closed as indicated in FIG. 1. Hence, any electrically powered equipment, arranged within the enclosure formed by the fence or barrier, is not accessible. At that time, the alignment mechanical link or the close proximity of the two switch components permits a signal to move between them which activates the switch to control the electrical power line connected to the electrically powered equipment. The switch components may be of any conventional type, such as transmitting a radio wave-type of signal between them, or a light from a cell to a receiver, or a magnetic force or even a mechanical key lock arrangement which lock the components together, that activate the safety switch until it is intentionally deactivated. In the case of a key lock, the key opening, for example, may be formed in component 16 on the frame, so that the key opening would be covered by the slider when the slider is lowered.

When someone wishes to enter the enclosure, that is, to open the door, the slider is lifted upwardly by grasping the handle 31 and manually moving it upwardly. FIG. 4 illustrates the door in locked position with the keeper 47 engaged within the slider. In that condition, the two components of the safety switch are close to each other and aligned and, therefore, activate the switch to permit the flow of current through the power line to the electrically powered equipment.

Figures 12, 13:
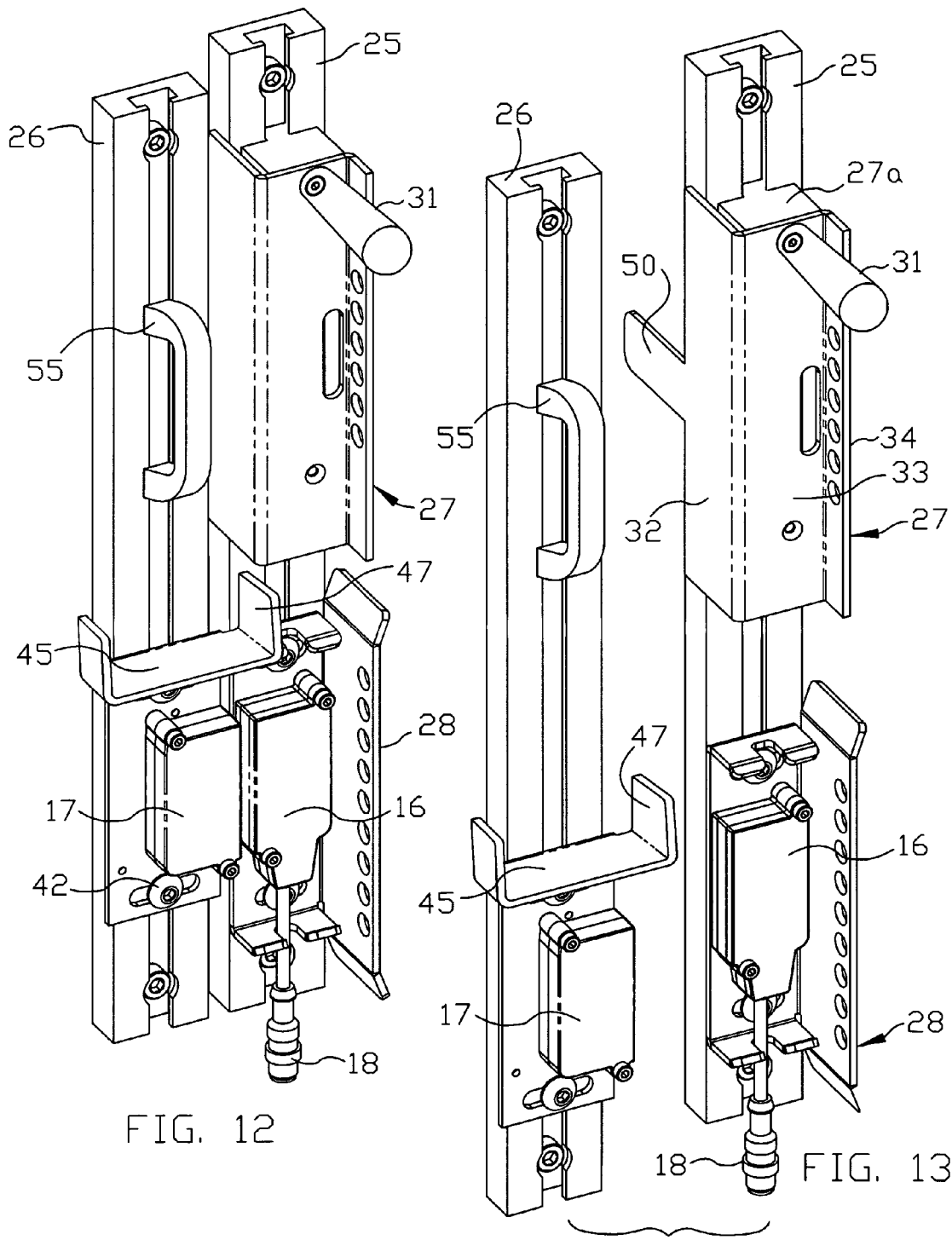
FIG. 12 illustrates the lockout slider raised upwardly to disengage the door edge keeper for opening the door.
FIG. 13 is a fragmentary view showing the door edge in open position relative to the frame jamb, with the slider in raised position.

When it is desired to open the door, the handle 31 is grasped and the slider is manually moved upwardly to disengage the slider from the keeper 47 (see FIG. 12). At that point, the door handle 55 may be pulled to open the door (see FIG. 13). Once the door is opened, the slider handle 31 may be released. The slider will automatically slide downwardly under gravity, or optionally can be manually moved downwardly, into the position shown in FIG. 14 to cover the component 16.

To prevent the door from being accidentally or inadvertently closed, which would thus align the switch components and activate the switch for permitting electricity to flow to the enclosed equipment, the blocking flange 45, upon which the keeper 47 is formed, engages against adjacent exposed surface of the slider which is in its lowered position (see FIG. 5). In the lowered position, the slider covers the switch component that is mounted on the frame or jamb. Hence, the blocking flange engaging against the slider, coupled with the covering of the switch component, prevents the door from closing and prevents the two switch components from moving into close proximity. Covering the component prevents the signaling between the two components, or the use of a key where a key lock is used, which would allow the activation of the switch. And the engagement of the blocking flange 45 against the slider physically prevents the door from completely closing. If a key lock is used, the slider blocks entry of the key into the lock's keyhole. Thus, realignment of the components is prevented.

In practice, in order to open the door and simultaneously deactivate the safety switch, the person who is to enter the enclosure must physically lift the slider upwards a sufficient distance to disengage the keeper from the slider, and then physically open the door. Once the door is opened, the slider will automatically, by gravity, drop down to cover the switch component and to block the closing of the door due to its engagement with the blocking flange located on the door edge. That condition remains until someone physically lifts the slider high enough to clear the blocking flange and then drops down to engage the keeper when the door is closed. The deliberate, intentional movement of the slider avoids unintentional or accidental opening or closing of the door. Hence, the safety switch is automatically locked out to prevent the passage of electrical current to the equipment within the enclosure, and remains locked out until someone deliberately and intentionally operates the slider to close the door and to realign the components of the safety switch.

Because the lockout system consists of few components, which may be inexpensively manufactured and can be easily installed using commonly available hand tools, the system inexpensively provides an automatic safety measure to preclude accidental harm to someone who is working within the enclosure.

The foregoing describes an operative embodiment of this invention. Thus, having fully disclosed an operative embodiment, the foregoing description should be read as being merely illustrative of a best mode and considered in the light of the following claims. I now claim.

What is claimed is:

1. A safety lockout system for a door-like, moveable closure which has an edge that is normally adjacent to, and aligned with, a fixed member such as a door-like frame, when closed and being spaced from said fixed member when open, comprising:

a switch having a pair of cooperating switch components, one component being formed upon said closure edge and the other component being formed upon the fixed member in normal alignment with the first named component when the closure is in closed position, so that the components are normally closely adjacent to each other when the switch thereby is actuated for allowing the passage of electrical current and so that the switch is deactivated for preventing the passing current when the components are non-aligned and relatively widely separated when the door-like closure is at least partially opened;

a slider element mounted upon one of the door edge or fixed member and a cooperating keeper and a stop member mounted upon the other of the closure edge or fixed member with the slider normally engaging the keeper for locking the closure in its closed position;

said slide element being manually moveable for disengagement with the keeper for unlocking the closure from the fixed member and being automatically moved by gravity downwardly to cover one of the switch components and to engage the stop member, and thereby, hold the closure in at least a partially open position relative to the fixed member;

whereby the slide element is normally engaged with the keeper for locking the closure to the fixed member when the closure is in its closed position, but the slide element is manually lifted to disengage it from the stop member for enabling the closure to be opened and then upon release of the slider, the slider will automatically slide down and thereby prevent the closure from being closed and to prevent the switch components from aligning relative to each other so that the electrical flow is interrupted and the closure is prevented from inadvertently completely closing and the slide element is manually raised again for moving the closure into its closed position and thereby permitting the flow of electricity through the switch.

2. A safety lockout system for preventing close alignment of a pair of power control switch components which cooperate to control the flow of electric current or signals to an electrically powered device, which components are respectively mounted on a moveable door-like closure at a portion of a fixed member adjacent said edge, such as a portion of a door-like frame member; and said switch being normally activated to pass electrical current when the closure is in a closed position with the components aligned and closely adjacent each other and with the electrical switch being deactivated to prevent the flow of current or signals when the components are widely separated due to partial opening of the door-like closure, said system comprising:

a slider member located above one of the switch components and a keeper mounted above the other of the components;

said slider member being arranged to normally engage the keeper when the closure is normally positioned in its closed position;

said slider member being manually slideably upwardly moveable to disengage it from the keeper whereby the closure is moved away from said edge member into a closure open position;

and said slider member being normally automatically slideable downwardly into a position to cover over its respective adjacent component and to block any locking engagement with the keeper so that the closure cannot be closed and the components cannot be closely aligned, whereby the switch is deactivated against the passage of current;

and whereby the slider member being manually raised to simultaneously uncover its respective switch components and to engage the keeper for permitting moving the closure into its closed position and enabling activation of the then closely aligned switch components for allowing the passage of electrical current by the switch.

3. A safety lockout system for a safety switch mounted upon a door-like closure for an access opening in a barrier for protecting an electrically powered device, and an adjacent portion of an edge defining such opening for controlling the flow of electrical current, to said device for thereby limiting access to said device, which switch comprises a pair of cooperating components, with one component secured to the closure and the other component secured to said edge portion and with the switch being actuated for allowing current or signals to flow to the device when the closure is in a closed position over said opening when the switch components are arranged closely adjacent to, and aligned with, each other, and with the switch being deactivated when the closure is at least partially opened so that the switch components are widely separated from each other; said system comprising:

a slider mounted adjacent one of said components and arranged for sliding over and covering said adjacent component and simultaneously keeping the other component away from said covered component a sufficient distance to prevent activation of the switch components;

a keeper element mounted adjacent the other component and positioned to normally lockingly engaging the slider when the closure is in its closed position and to temporarily engage the slider for blocking the closure from moving into a closed position when the slider is in position to cover its adjacent component, said slider being moveable manually into a position to disengage from locking with the keeper and for then automatically sliding into a position to cover its adjacent component and hold the keeper in its disengaged position;

and thereafter said slider being manually moveable into its initial position away from its adjacent component and into locking engagement with the keeper for holding the door closure in closed position;

whereby the slider is manually moved to a first position to disengage it from the keeper in order to move the closure into an open position to separate the components and the slider may move into a second position to cover over its adjacent component and to prevent the keeper from lockingly engaging the slider and for holding the keeper at a position which prevents the components from being closely adjacent to thereby prevent the switch from allowing the passage of the electrical current to said device.

4. A construction as set forth in claim 3, and wherein the slider is slideably mounted in a track arranged upon an edge of the closure and arranged so that the slider is manually slid upwardly into an upward position which unlocks the slider from the keeper and then automatically slides downwardly by gravity into a downward position which simultaneously covers its adjacent switch component and engages and holds the keeper in a position which prevents the closure from closing over said opening to prevent the components from closely aligning until the slider is again manually raised above its adjacent component.

5. A safety lockout system for a safety switch which controls the flow of electrical current or signals to an electrically powered device which is protected against unintentional access by a wall-like barrier having an access opening that is normally closed by a door-like closure, with the safety switch having a switch component mounted on the closure and a cooperating switch component mounted on a portion of an edge defining said access opening, and with the two components cooperating when closely aligned when the closure is in closed position to permit the flow of electrical current or signals to the device and to prevent the flow of current to the device when the components are widely separated when the closure is in its open position relative to the barrier opening, comprising:

a slider mounted above the components upon one of the closures or portion of said opening;

said slider normally being located in an upwards position above one of the components, and being slideable into a downward position to cover said one component;

a keeper element mounted on the other of the closure or portion of the opening edge and normally lockingly engaging the slider when the slider is in its upward position to thereby lock the slider from moving downwardly and to prevent the closure from moving into an open position;

said slider being manually movable further upwardly to disengage it from the keeper so that the closure is opened relative to the barrier opening, and the slider may then be movable downwardly into a position covering said one component; and a blocking element adjacent the keeper location and extending towards said slider in a position to contact said slider to block the movement of the closure into its fully closed position relative to the barrier opening until the slider is again manually moved upwardly to its upward position above said one component;

whereby when the closure is opened, the components are widely separated to prevent current flow to said device and the closure is prevented from being inadvertently moved into its closed position and cannot be closed until the slider is deliberately, manually raised to its original position above said one component.

6. A safety lockout system as defined in claim 5 and wherein the slider is slideably mounted upon a slide track above said one component and automatically slides down under the influence of gravity to its position covering said one component and contacting said blocking element immediately after it is manually raised to disengage the engagement with the keeper.

7. A safety lockout system as defined in claim 6, and including said slider being mounted upon a portion of the vertical edge defining said opening in the barrier and said keeper and said blocking element being mounted upon a vertical free edge of the closure which is adjacent said portion of the vertical edge defining the opening.

* * * * *